Patented Jan. 19, 1954

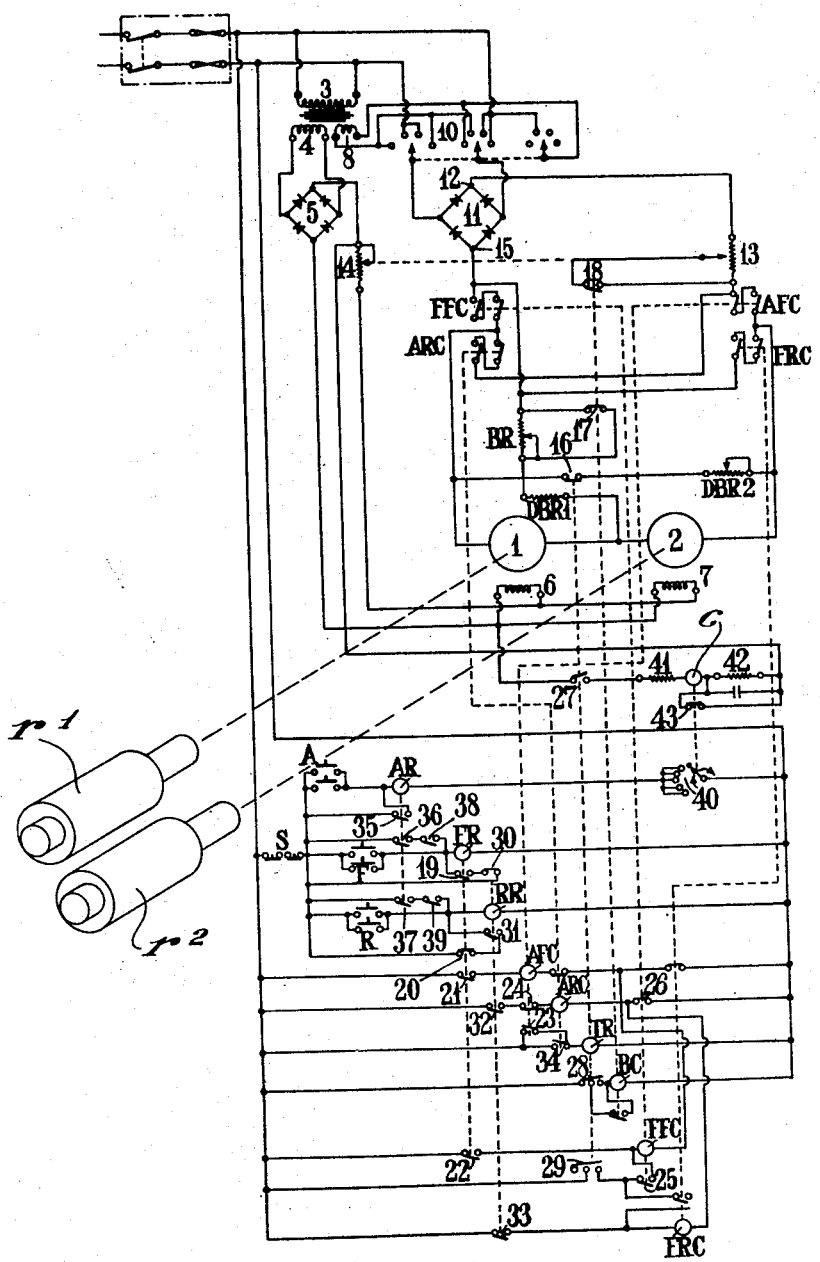

2,666,875

UNITED STATES PATENT OFFICE 2,666,875

PLURAL MOTORS DRIVING REVERSIBLE DRAW ROLLERS

William John Norton, Salford, England, assignor to Sir James Farmer Norton & Company Limited, Salford, England, a British company Application July 17, 1950, Serial No. 174,151

Claims priority, application Great Britain October 3, 1949

5 Claims. (Cl. 318—7)

This invention relates to dye jiggers and like machines of the type comprising two draw rollers between which the cloth is caused to pass back and forth through a liquor or dye bath, the rollers being revolved each by a direct current motor, the armatures of the two motors being in series.

The object of the present invention is to provide improved means for controlling the operation of the said motors in order to improve the functioning of the machines.

In accordance with this invention, the motors when starting up from rest have their speeds automatically controlled so that their speeds build up over a predetermined period of time. This is effected by allowing braking of the armatures to continue after starting up for the predetermined period under the control of a clockwork or other timing relay. The let-off roller has a further braking action applied thereto for a predetermined period of time after starting and until such roller attains a steady speed. It will be understood that the let-off roller being the full roller will tend at starting to have an irregular or jerky motion which is minimised by the further dynamic braking action.

I also provide means which cause dynamic braking of both motors to occur at the moment that current to the motors is switched off to bring the machine to rest. This ensures that both motors and their rollers are brought to rest simultaneously and that the let-off roller does not continue to run after the take-on roller has come to rest which would result in slack cloth accumulating between the rollers.

I further provide that at each reversal of the motors and the rollers they drive, whether such reversal is carried out automatically or manually, the machine is brought to rest and maintained at rest for a predetermined period of time before reversal is effected in order to ensure steady conditions at the commencement of the reverse drive. This is effected by providing a delay switch which when the main switch for reversal is closed causes a delay to ensue before the motor circuit is finally closed.

I may provide means for counting and indicating or recording the number of reversals made by the machine.

The direct current for the motors may be obtained from A. C. mains by the use of grid controlled thermionic valves or other type of rectifier. In the case of the thermionic valves, the grid voltage controls the output of direct current to the motor armatures. The field coils may be fed from the same or similar valves or rectifiers.

The accompanying drawing shows diagrammatically the electrical circuit arrangement of a control system in accordance with the invention.

There are two motors 1, 2, each of which drives one of the rollers $r^1$, $r^2$ of the dye jigger, the armatures of the motors being in series. Electric current for the motors is supplied by a transformer 3, of which one secondary winding 4 supplies current through a rectifier 5 to the field windings 6, 7. The other secondary winding 8 and the primary winding are connected to a four-position speed range switch 10 whereby the windings are connected in various ways to a rectifier 11 so as to supply different voltages thereto.

The output terminal 12 of rectifier 11 is connected to an armature regulator resistance 13, which is coupled with a field regulator resistance 14 in series with the field windings so that first the resistance 13 and then the resistance 14 is cut out when the speed is to be increased. The resistance 13 is connected to one terminal of armature forward contactor AFC and armature reverse contactor ARC. The other terminal 15 of the rectifier output is connected through a brake regulator BR and a dynamic brake resistance DBR1 to the conductor between the armatures of the motors 1 and 2. It is connected also to one terminal of field forward contactor FFC and field reverse contactor FRC. The other terminals of contactors FFC and ARC are connected to the armature of motor 1 and the other terminals of contactors AFC and FRC are connected to the armature of motor 2. Across the two armatures is connected a dynamic brake resistance DBR2 in series with a normally closed contact 16. There is a normally closed contact 17 shorting brake regulator BR, and a normally open contact 18 in the conductor shorting the inoperative part of resistance 13.

The contactors are actuated by means of a series of relays energised by current supplied direct from the input, and controlled by push buttons. A push button S is normally closed, and stops the equipment when opened. When forward push button F is closed, it completes the circuit of forward relay FR, which then closes a holding contact 19, opens a contact 20 in a holding circuit of a reverse relay RR, and closes contacts 21, 22 to energise the operating coils of contactors AFC and FFC. The former closes its main contacts referred to above and also closes a contact 23 to complete the circuit of a timing relay TR and opens a contact 24 in the circuit of contactor coil ARC. The latter closes its main contacts and a holding contact 25 and opens a contact 26 in the circuit of contactor coils ARC and FRC. The timing relay TR responds, opens contact 16, closes contact 27 referred to below and after a predetermined delay closes contact 28 to a brake contactor BC and contact 29 which completes the holding circuit of coil FFC. The brake contactor BC then closes contact 18 and opens contact 17.

By these means, the armature of motor 2 is energised and the armature of motor 1 has dynamic brake resistance DBR1 connected across it, brake regulator BR being shorted, and the whole of resistance 13 being in circuit. Then after the speed has built up for a predetermined period, contactor BC puts brake regulator BR in circuit and shorts the appropriate part of resistance 13. The resistance 13 provides initial braking of the armatures, and the shorting of resistance BR provides the further initial braking action for the let-off roller.

When reverse push button R is pressed, reverse relay RR is energised, opening contact 30 in the holding circuit of FR, and closing a holding contactor 31, contact 32 to contactor ARC and contact 33 to contactor FRC. As relay FR drops, contact 20 in the holding circuit of RR is closed, an1 contactors AFC and FFC are de-energised, as also is relay TR by contact 23 and also relay BC. Contactors ARC and FRC are actuated in the manner previously described for AFC and FFC, and relay TR is again energised by contact 34. The motor 1 is then driven in the opposite direction and the braking circuit DBR1 and BR is connected across armature 2.

For automatic operation, a push button A is provided which energises automatic relay AR. This closes a holding contact 35, and contacts 36 and 37 in circuits for short-circuiting relays FR and RR. These circuits however include also normally open contacts 38 and 39 each of which closes only when the corresponding roller is empty, with the result that relays FR and RR are energised alternately as one or other roller becomes empty.

In series with relay AR there is a contactor 40 having a rotating arm and a number of contacts which the arm touches successively as it rotates. Only five contacts are shown, but a larger number, say 25, may conveniently be used. A circuit supplied by rectifier 5 includes contact 27 actuated by timing relay TR, and a counter C which rotates the arm of contactor 40 one step at each operation. Consequently, the arm moves to the next contact at each operation of relay TR, i. e. at each reversal, and after the number of reversals for which it was set, it breaks the circuit of relay AR and stops the machine. There is a resistance 41 in series with C, and a further economy resistance 42, normally shorted by contact 43 is put into circuit by the opening of contact 43 when contact 27 closes.

When the driving current for the motors is switched off on one of the contactors AFC, ARC dropping, the relay TR is de-energised and contact 16 is closed, putting dynamic braking resistance DBR2 in circuit across both motors, to bring the machine to rest.

Also when contactor AFC drops for an automatic or manual reversal, and relay RR is energised, contactor coils ARC and FRC cannot respond at once owing to contact 26 being open. Relay TR must first be de-energised whereby after a delay contact 29 opens and coil FFC is de-energised, closing contact 26 and energising coil ARC. The operation is similar when ARC is de-energised and FR is energised. The result is that the machine is brought to rest for a predetermined period before reversal is effected.

What I claim is:

1. Motor control means, for use in dye jiggers and like machines of the type comprising two draw rollers between which a material is caused to pass back and forth and direct current motors for driving the rollers, comprising contactors for connecting one motor at a time to a power supply for forward and reverse running, a speed regulating resistance adapted to be connected in series with the active motor by the contactors, a brake regulating resistance, further contactors adapted to connect the brake regulating resistance in parallel with the armature of the inactive motor, a normally open relay contact connected across at least a part of the speed regulating resistance, a normally closed relay contact connected across at least a part of the brake regulating resistance, and a timing relay adapted to control said contacts, and means for energising the timing relay to cause the normally open contact to close and the normally closed contact to open, after a predetermined period from the starting of one of the motors.

2. Means as claimed in claim 1, and having separate relays for actuating the contactors, manual means for energising said relays, and means for energising said relays automatically when the corresponding rollers become empty.

3. Means as claimed in claim 2, and having a delay switch for preventing operation of the contactors for reversal of the motors until they have been at rest for a predetermined period.

4. Means as claimed in claim 1, and having a dynamic braking resistance connected across the armatures of both motors, and a relay contact in series therewith adapted to be closed by the timing relay while one of the motors is running and to be closed when the current to the motors is cut off.

5. Means as claimed in claim 1, in which the timing relay is arranged to be actuated by the contactors and has delayed action contacts for controlling the brake and speed regulating resistances.

WILLIAM JOHN NORTON.

References Cited in the file of this patent

UNITED STATES PATENTS

| Number | Name | Date |
|---|---|---|
| 1,063,400 | Varney | June 3, 1913 |
| 1,426,939 | Wright | Aug. 22, 1922 |
| 2,202,419 | Geuder | May 28, 1940 |
| 2,214,617 | Kenyon | Sept. 10, 1940 |
| 2,299,423 | Neuman | Oct. 20, 1942 |
| 2,310,141 | Willby | Feb. 2, 1943 |
| 2,519,218 | Bacheler | Aug. 15, 1950 |